United States Patent
Grant et al.

(10) Patent No.: US 9,987,555 B2
(45) Date of Patent: Jun. 5, 2018

(54) SYSTEM AND METHOD FOR PROVIDING HAPTIC STIMULUS BASED ON POSITION

(71) Applicant: IMMERSION CORPORATION, San Jose, CA (US)

(72) Inventors: Danny A. Grant, Laval (CA); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 458 days.

(21) Appl. No.: 13/998,001

(22) Filed: Sep. 23, 2013

(65) Prior Publication Data

US 2014/0043228 A1    Feb. 13, 2014

Related U.S. Application Data

(63) Continuation of application No. 12/751,780, filed on Mar. 31, 2010, now Pat. No. 8,540,571.

(51) Int. Cl.
*A63F 13/285* (2014.01)
*A63F 13/428* (2014.01)
*G06F 3/01* (2006.01)

(52) U.S. Cl.
CPC .......... *A63F 13/285* (2014.09); *A63F 13/428* (2014.09); *G06F 3/011* (2013.01); *G06F 3/016* (2013.01); *A63F 2300/105* (2013.01); *A63F 2300/1037* (2013.01)

(58) Field of Classification Search
CPC .......... A63F 13/02; A63F 13/06; A63F 13/10; A63F 2300/105; A63F 2300/1037; G06F 3/01; G06F 3/011; G06F 3/016

USPC ............................................. 463/37; 345/156
See application file for complete search history.

(56) References Cited

U.S. PATENT DOCUMENTS

| | | | | |
|---|---|---|---|---|
| 6,084,587 A | * | 7/2000 | Tarr | G06T 15/00 345/419 |
| 6,366,272 B1 | * | 4/2002 | Rosenberg | A63F 13/285 345/156 |
| 6,413,229 B1 | * | 7/2002 | Kramer | A61B 5/225 600/595 |

(Continued)

FOREIGN PATENT DOCUMENTS

| | | |
|---|---|---|
| CN | 1231753 A | 10/1999 |
| CN | 1714388 A | 12/2005 |

(Continued)

OTHER PUBLICATIONS

International Search Report and Written Opinion, issued for International Application No. PCT/US2011/030661, dated Sep. 26, 2011.

(Continued)

*Primary Examiner* — Omkar Deodhar
*Assistant Examiner* — Shauna-Kay Hall
(74) *Attorney, Agent, or Firm* — Medler Ferro Woodhouse & Mills PLLC

(57) ABSTRACT

A method of producing a haptic effect includes receiving a sensory content signal from a user interface device, receiving a sensor signal of a body position of a first body part of a user with respect to a second body part of the user, generating the haptic effect using the sensory content signal and the sensor signal, and applying a drive signal to a haptic actuator to produce the haptic effect.

21 Claims, 2 Drawing Sheets

(56) References Cited

U.S. PATENT DOCUMENTS

| | | | |
|---|---|---|---|
| 7,280,097 B2 | 10/2007 | Chen et al. | |
| 8,368,641 B2* | 2/2013 | Tremblay | G06F 3/011 345/156 |
| 2002/0021277 A1* | 2/2002 | Kramer | G06F 3/016 345/156 |
| 2002/0035995 A1* | 3/2002 | Schmidt | A61M 21/00 128/898 |
| 2003/0016207 A1* | 1/2003 | Tremblay | G06F 3/011 345/156 |
| 2004/0054667 A1 | 3/2004 | Kake et al. | |
| 2004/0095311 A1 | 5/2004 | Tarlton et al. | |
| 2005/0128186 A1 | 6/2005 | Shahoian et al. | |
| 2005/0285824 A1* | 12/2005 | Shin | G09G 3/325 345/76 |
| 2005/0289472 A1* | 12/2005 | Morita | G06F 3/011 715/757 |
| 2007/0252832 A1 | 11/2007 | Ratai | |
| 2008/0055248 A1 | 3/2008 | Trembley et al. | |
| 2008/0094351 A1* | 4/2008 | Nogami | G06F 3/016 345/156 |
| 2008/0094354 A1 | 4/2008 | Nagomi et al. | |
| 2009/0088659 A1* | 4/2009 | Graham | G06F 3/016 600/545 |
| 2009/0098519 A1 | 4/2009 | Byerly | |
| 2009/0131165 A1* | 5/2009 | Buchner | A63F 13/02 463/30 |
| 2009/0135133 A1* | 5/2009 | Kunzler et al. | 345/156 |
| 2009/0278791 A1* | 11/2009 | Slycke et al. | 345/156 |
| 2010/0053151 A1 | 3/2010 | Marti et al. | |
| 2010/0128112 A1* | 5/2010 | Marti | G06F 3/011 348/51 |
| 2011/0010618 A1* | 1/2011 | Crawford et al. | 715/702 |
| 2011/0118032 A1* | 5/2011 | Zalewski | 463/39 |

FOREIGN PATENT DOCUMENTS

| | | |
|---|---|---|
| EP | 1 916 592 | 4/2008 |
| JP | 2001-356875 A | 12/2001 |
| JP | 2003-085590 A | 3/2003 |
| JP | 2008-500624 A | 1/2008 |
| JP | 2008-134990 A | 6/2008 |
| JP | 2008-176779 | 7/2008 |
| WO | WO 2005/116809 | 12/2005 |

OTHER PUBLICATIONS

Non-Final Office Action as issued in Japanese Patent Application No. 2013-502828, dated Mar. 3, 2015.
Notification of First Office Action as issued in Chinese Patent Application No. 201180016371.3, dated Mar. 25, 2015.
Japanese Non-Final Office Action, issued in Japanese Patent Application No. 2016-033055, dated Mar. 28, 2017.
Korean Notice of Preliminary Rejection, issued by KIPO in Korean Application No. 10-2012-7028473, dated Apr. 24, 2017.
Final Office Action issued in JP Application No. 2016-033055, dated Sep. 26, 2017.
Tsujikawa, Y. et al., "A Control System for Virtual Viewpoint with Egocentric and Exo-centric Metaphors," Graduate School of Engineering, Osaka University, Proceedings of the 2002 IEICE General Conference.
Jan. 22, 2018 Office Action issued in corresponding Korean Patent Application No. 10-2018-7000989.
Jan. 17, 2018 Office Action issued in corresponding Chinese Patent Application No. 201610031251.5.

* cited by examiner

SYSTEM AND METHOD FOR PROVIDING HAPTIC STIMULUS BASED ON POSITION

CROSS-REFERENCE TO RELATED APPLICATIONS

This application is a continuation application of U.S. patent application Ser. No. 12/751,780, filed Mar. 31, 2010, the entire content of which is incorporated herein by reference.

FIELD OF THE INVENTION

The invention relates to the providing haptic stimulus to users based on position.

BACKGROUND OF THE INVENTION

Systems that provide haptic stimulus to users in conjunction with visual and/or audio content are known. It is generally understood that haptic stimulus may enhance one or more aspects of the experience of the users associated with the content. However, conventional systems do not vary the haptic stimulus based on position information related to the position of the user or a body part of the user. Instead, the haptic feedback is determined and generated without regard for the position of the users, the position of the actuators generating the haptic feedback, the position of the user interface device conveying the visual and/or audio content, and/or other positions.

SUMMARY

One aspect of the invention relates to a system configured to provide haptic stimulus to one or more users. In one embodiment, the system comprises a user interface, an actuator, and one or more processors. The user interface device has a content delivery portion from which sensory content is conveyed to one or more users. The actuator is configured to generate haptic stimulus associated with the sensory content being conveyed to at least one of the one or more users. The one or more processors are configured to execute computer program modules. The computer program modules comprise a stimulus module, and an actuator module. The stimulus module is configured to determine haptic stimulus to be generated for the one or more users that is associated with the sensory content being conveyed to the one or more users, wherein the haptic stimulus varies as a function of position with respect to the content delivery portion of the user interface device. The actuator control module is configured to control the actuator to generate the haptic stimulus determined by the stimulus module.

Another aspect of the invention relates to a method of providing haptic stimulus to a user. In one embodiment, the method comprises conveying content to a user at a content delivery portion of a user interface device; determining haptic stimulus to be generated for the user that is associated with the content conveyed to the user, wherein the haptic stimulus varies as a function of position with respect to the content delivery portion of the user interface device; and generating the haptic stimulus.

Yet another aspect of the invention relates to a system configured to provide haptic stimulus to a user. In one embodiment, the system comprises a user interface device, an actuator, and one or more processors. The user interface device has a content delivery portion from which sensory content is conveyed to a user. The actuator is configured to generate haptic stimulus associated with the sensory content being conveyed to the user configured to be born by a first portion of the body of the user. The one or more processors are configured to execute computer program modules, the computer program modules comprising a stimulus module and an actuator control module. The stimulus module is configured to determine haptic stimulus to be generated for the user that is associated with the sensory content being conveyed to the user, wherein the haptic stimulus varies as a function of position of the first portion of the body of the user with respect to a second portion of the body of the user. The actuator control module is configured to control the actuator to generate the haptic stimulus determined by the stimulus module.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
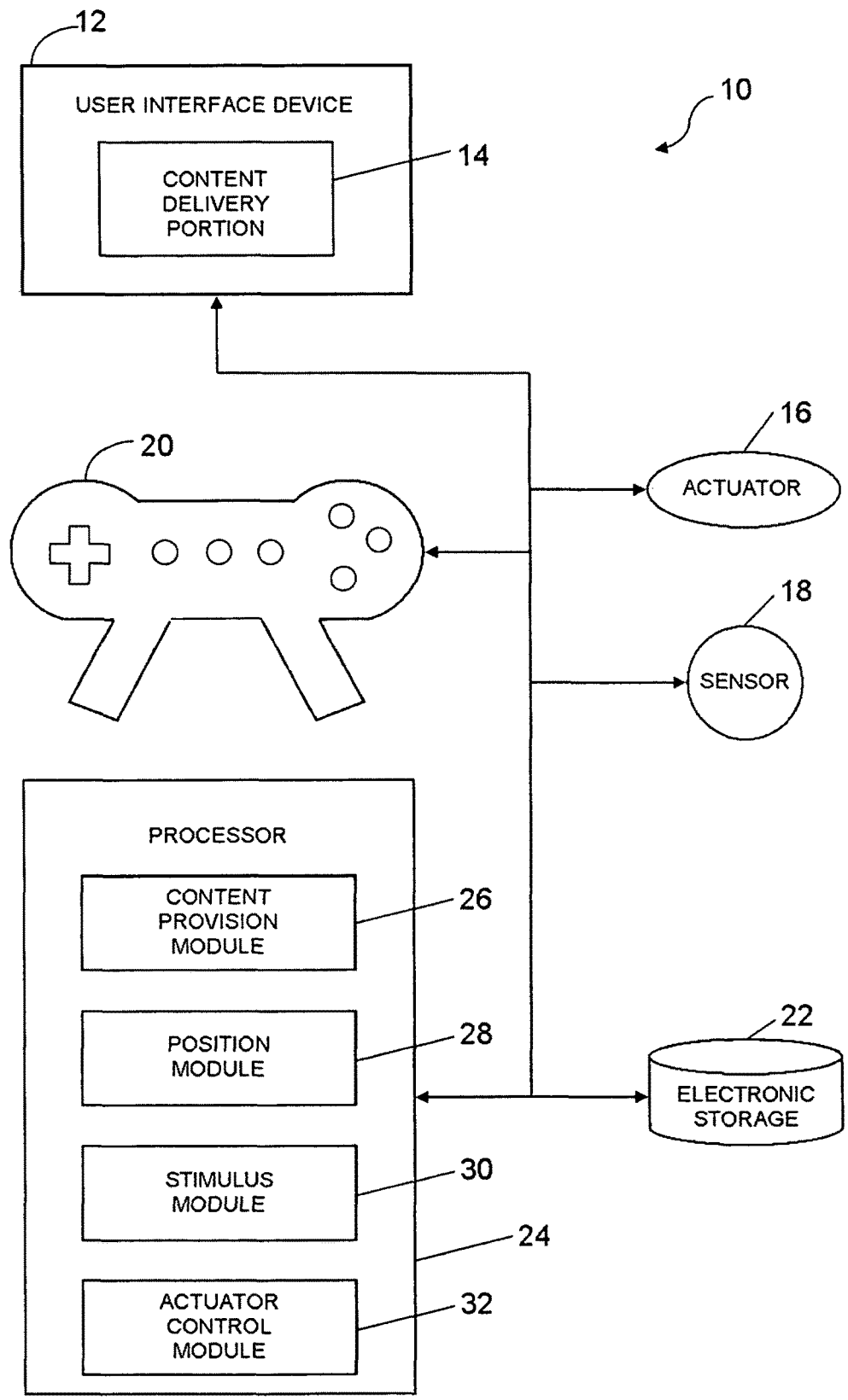
FIG. 1 illustrates a system configured to provide haptic stimulus associated with other sensory content, according to one or more embodiments of the invention.

FIG. 1 illustrates a system 10 configured to provide haptic stimulus associated with other sensory content being conveyed to one or more users. This may enhance the experience provided to the one or more users by the content. The sensory content may include video content, video game content, audio content, three-dimensional content, and/or other content. The system 10 is configured to vary the haptic stimulus associated with the other sensory content based on position information. Such position information may include information related to the position of the one or more users, the position of a controller (e.g., a game controller), the position of an actuator delivering the haptic stimulus, and/or other position information. In one embodiment, system 10 includes one or more of a user interface device 12 comprising a content delivery portion 14, one or more actuators 16, one or more sensors 18, one or more controllers 20, electronic storage 22, one or more processors 24, and/or other components.

The user interface device 12 is configured to provide sensory content to one or more users. The sensory content is conveyed to the one or more users through content delivery portion 14 of user interface device 12. In one embodiment, the user interface device 12 is configured to be positioned at a fixed location during the conveyance of content to the users, and not be moved and/or carried about by the users. This is not intended to be limiting, as one or more of the
} principles described herein could be extended to systems in which the user interface device is movable/portable (e.g., portable gaming systems, smartphones, etc.). In one embodiment, user interface device 12 includes an electronic display. In this embodiment, the display surface of the electronic display functions as content delivery portion 14 of user interface device 12. In one embodiment, user interface device 12 includes an audio speaker. In this embodiment, the area at which sound is emitted from user interface device 12 functions as content delivery portion 14. In one embodiment, user interface device 12 includes an electronic display and an audio speaker.

The sensory content provided to users by user interface device 12 may include video, such as movies, television, and/or other video. The sensory content provided to users by user interface device 12 may include graphics (dynamic and/or still) associated with a videogame, a virtual world, a simulation, and/or other computer generated graphics. In embodiments in which user interface device 12 conveys video, computer generated graphics, and/or other visual content to users, user interface device 12 may further provide audio content to users associated with the visual content. For example, a movie or television show, a videogame, or other types of visual content, may be associated with a sound track that is conveyed to the users simultaneously with the visual content. In one embodiment, user interface device 12 is configured to deliver audio content to the users without accompanying visual content.

In one embodiment in which user interface device 12 is an electronic display, user interface device 12 is capable of conveying three-dimensional views of content to users through a display surface that functions as content delivery portion 14. The three-dimensional views may include three-dimensional views of video content, computer generated images, and/or other visual content. By way of non-limiting example, in this embodiment, user interface device 12 may include one or more of systems employing active 3D glasses, lenticular displays, and/or other types of three-dimensional displays.

The actuators 16 are configured to generate haptic stimulus for the users. As such, at least some of actuators 16 are in contact with the users, or in contact with objects that contact the users, during conveyance of the sensory content to the users by user interface device 12. By way of non-limiting example, one or more of actuators 16 may be positioned in or on a floor surface supporting the users (e.g., installed in the floor, carried by a mat lying on the floor, etc.), one or more of actuators 16 may be carried by a brace or other wearable item worn by the users, one or more of the actuators 16 may be carried by objects that are carried by the users (e.g., carried by controllers 20), one or more of actuators 16 may be carried by furniture on which the users are seated or lying, and/or one or more of the actuators 16 may be carried by or disposed in or on other objects that contact the users.

As used herein, the term "haptic stimulus" refers to tactile feedback that is applied to the users. For example, such feedback may include one or more of vibrations, forces, and/or motions that are applied physically to the user by the actuators 16 and/or the objects with which both actuators 16 and the user are in contact. Non-contact tactile feedback in the form of ultrasonic energy, or other forms of energy may also be implemented as haptic stimulus. The actuators 16 may include any device configured to generate such feedback for application to the users. For example, actuators 16 may include one or more of a piezoelectric actuator, a pneumatic actuator, a eccentric mass actuator, an electroactive polymer actuator, an electrostatic surface actuator, shape memory alloy, and/or other actuators.

It will be appreciated that although actuators 16 are shown in FIG. 1 as a single entity, this is for illustrative purposes only. In one embodiment, actuators 16 includes a plurality of actuators. The plurality of actuators may be included in, carried by, and/or in contact with a single object or device. Or, the plurality of actuators may include actuators included in, carried by, and/or in contact with a plurality of separate objects or devices.

The sensors 18 are configured to generate output signals that convey information related to position. In one embodiment, the output signals convey information related to the position of one or more of at least one user, actuators 16 (e.g., if one or more of actuators 16 are included in or carried by a movable object), controllers 20, and/or other objects. The positions for which information is conveyed by the output signals of sensors 18 may include one or more of positions in an absolute coordinate system, positions with respect to user interface device 12 (e.g., positions with respect to content delivery portion 14), positions of one or both of actuators 16 and/or sensors 18 with respect to a user and/or the user's body parts, positions of users with respect to each other, and/or positions with respect to other objects.

One or more of any of a variety of sensors that generate output signals that convey information related to position may be implemented in system 10 as sensors 18. By way of non-limiting example, sensors 18 may include one or more of an accelerometer, a gyroscope, a digital compass, a ultrasonic echo-location sensor, an optical distance or proximity sensor, an imaging sensor (e.g., video or still imaging), RF sensors, and/or other sensors. It will be appreciated that the output signals of sensors 18 may directly convey positional information, such as distances, orientations, angles, and/or other positional information. The output signals of sensors 18 may indirectly convey positional information. For example, sensors 18 may convey information related to time derivatives of position (e.g., acceleration), images from which position can be determined, and/or other types of information from which position may be determined. The output signals may be output from sensors 18 "raw," or sensors 18 may include capabilities for providing some preliminary processing.

In one embodiment, sensors 18 include one or more sensors that are carried by other components of system 10 (e.g., actuators 16, sensors 18, etc.). In one embodiment, sensors 18 include one or more sensors that are not moved during use. In one embodiment, sensors 18 include one or more sensors that are provided as separate components that are wearable by users.

The controllers 20 are configured to provide user interaction and control with respect to system 10. In one embodiment, controllers 20 include one or more game controllers implemented by users to manipulate virtual characters and/or objects in a videogame, virtual world, and/or simulation. In one embodiment, controllers 20 include one or more electronics controllers configured to provide users with control over configurations and/or settings of one or more other components in system 10 (e.g., a remote control for user interface device 12). The controllers 20 may include handheld controllers, camera controllers that work in conjunction with handheld components (e.g., Sony PlayStation® Eye and PlayStation® Motion Controller), and/or controllers that are not handheld (e.g., flight simulation controls, driving simulation controls, etc.).

In one embodiment, electronic storage 22 comprises electronic storage media that electronically stores information. The electronic storage media of electronic storage 22 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 22 may store software algorithms, information determined by processor 24, content to be conveyed to users through user interface device 12, and/or other information that enables system 10 to function properly. Electronic storage 22 may be a separate component within system 10, or electronic storage 22 may be provided integrally with one or more other components of system 10 (e.g., user interface device 12, processor 24, etc.).

Processor 24 is configured to provide information processing capabilities in system 10. As such, processor 24 may include one or more of a digital processor, an analog processor, a digital circuit designed to process information, an analog circuit designed to process information, a state machine, and/or other mechanisms for electronically processing information. Although processor 24 is shown in FIG. 1 as a single entity, this is for illustrative purposes only. In some implementations, processor 24 may include a plurality of processing units. These processing units may be physically located within the same device, or processor 24 may represent processing functionality of a plurality of devices operating in coordination. For example, in one embodiment, the functionality attributed below to processor 24 is divided between a first processor provided in a computer, a videogame console, an optical disk player, and/or other home entertainment equipment, and a second processor that communicates with the first processor to provide position information to the first processor.

As is shown in FIG. 1, processor 24 may be configured to execute one or more computer program modules. The one or more computer program modules may include one or more of a content provision module 26, a position module 28, a stimulus module 30, an actuator control module 32, and/or other modules. Processor 24 may be configured to execute modules 26, 28, 30, and/or 32 by software; hardware; firmware; some combination of software, hardware, and/or firmware; and/or other mechanisms for configuring processing capabilities on processor 24.

It should be appreciated that although modules 26, 28, 30, and 32 are illustrated in FIG. 1 as being co-located within a single processing unit, in implementations in which processor 24 includes multiple processing units, one or more of modules 26, 28, 30, and/or 32 may be located remotely from the other modules. The description of the functionality provided by the different modules 26, 28, 30, and/or 32 described below is for illustrative purposes, and is not intended to be limiting, as any of modules 26, 28, 30, and/or 32 may provide more or less functionality than is described. For example, one or more of modules 26, 28, 30, and/or 32 may be eliminated, and some or all of its functionality may be provided by other ones of modules 26, 28, 30, and/or 32. As another example, processor 24 may be configured to execute one or more additional modules that may perform some or all of the functionality attributed below to one of modules 26, 28, 30, and/or 32.

The content provision module 26 is configured to control the provision of content to the users via user interface device 12. If the content includes computer generated images (e.g., in a videogame, virtual world, simulation, etc.), content provision module 26 is configured to generate the images and/or views for display to the users through user interface device 12. If the content includes video and/or still images, content provision module 26 is configured to access the video and/or still images and to generate views of the video and/or still images for display on user interface device 12. If the content includes audio content, content provision module 26 is configured to generate the electronic signals that will drive user interface device 12 to output the appropriate sounds. The content, or information from which the content is derived, may be obtained by content provision module 26 from electronic storage 22.

The position module 28 is configured to determine position information from the output signals generated by sensors 18. The position information may include information related to one or more of positions of users, positions of actuators 16, positions of sensors 18, positions of controllers 20, and/or other positions. The information related to position determined by position module 28 may describe the position of one or more objects (e.g., users, actuators 16, sensors 18, controllers 20, etc.) in an absolute coordinate system, with respect to other objects, and/or in other contexts. As used herein, "position information" or "information related to position" does not refer to gestures or movements correlated with control inputs. Instead, "position information" or "information related to position" refers simply to information that describes the position of an object, either in a coordinate system or with respect to some other object. Such information may include, without limitation, coordinates, distances, rotational orientations, and/or angular relationships.

The stimulus module 30 is configured to determine haptic stimulus to be generated for the user. Determining the haptic stimulus includes determining which one(s) of actuators 16 should apply the stimulus, and/or determining one or more parameters of the haptic stimulus. Such one or more parameters may include one or more of magnitude of force, directivity and orientation, location of the stimulus, frequency of vibration, magnitude, duration, and/or other parameters.

The haptic stimulus determined by stimulus module 30 is associated with the sensory content being conveyed by user interface device 12. As such, the stimulus may be dictated, at least to some extent, by the information stored electronically with the content (e.g., on electronic storage 22). The haptic stimulus is determined by stimulus module 30 to enhance one or more aspects of the experience provided by the content. For example, the haptic stimulus may be determined to enhance one or more of the realism of the content, the enjoyability of content, perception of the content by the users, and/or other aspects of the experience provided by the content being conveyed to the users via user interface device 12.

To enhance the one or more aspects of the experience provided by the content being conveyed to the users via user interface device 12, stimulus module 30 is configured to determine the haptic stimulus based on information related to position. This includes varying the haptic stimulus based on user position with respect to user interface device 12, position of one body part of a user with respect to another body part of the user, position of one user with respect to one or more other users, and/or position information. In varying the haptic stimulus based on position, stimulus module 30 may change the stimulus in distinct steps, or smoothly. For example, if user interface device 12 is configured to provide three-dimensional views at discrete, predetermined viewing angles with respect to the display surface functioning as content delivery portion 14, then stimulus module 30 may vary the haptic stimulus such that each of the predetermined viewing angles receives haptic stimulus corresponding to its three-dimensional view. As another example, if one user is standing behind another user with respect to user interface device 12, the haptic stimulus provided to the user that is further away may reflect "shielding" by the user standing in the middle.

The determination of the haptic stimulus to account for position information may be based on determinations of position information by position module 28, and/or position information related to the positions of actuators 16 that is prestored or configured. It will be appreciated that the discussion of varying haptic stimulus based on position information described herein is distinct from varying haptic stimulus based on input or control gestures. The determination of haptic stimulus based on position by stimulus module 30 is not dependent on a gesture or physical maneuver being performed by a user. Instead, haptic stimulus determined by stimulus module 30 that corresponds to a given control or input gesture would vary based on the position of the user (or relative positions of the users body parts) during performance of the control or input gesture). Similarly, haptic stimulus that does not correspond to a control or input gesture (e.g., associated with an effect or component of the content being conveyed to the user) may be determined by stimulus module 30 to vary based on similar position information.

In one embodiment, stimulus module 30 determines haptic stimulus to be generated for a user to coincide with the directivity and orientation of an effect in the content being conveyed to the user. For example, if user interface device 12 is configured to generate three-dimensional images through a display surface functioning as content delivery portion 14, the haptic stimulus is varied as a function of viewing angle, distance from content delivery portion 14, and/or both viewing angle and distance to convey the directivity and orientation of a visual entity in a three-dimensional view being conveyed by user interface device 12. Other position-related parameters may be used instead, or in conjunction with, viewing angle and/or distance to vary the haptic stimulus.

As a specific instance of this example, if a ball in the three-dimensional view is projected outward away from content delivery portion 14 along a path, the haptic stimulus is determined by stimulus module 30 to mimic being hit by the ball for users positioned on or near the path. Users positioned off of the path, on the other hand, would not receive such stimulus. It will be appreciated that some other projectile may be substituted for the ball. As another specific instance of this example, if an explosion is shown in the three-dimensional view, the haptic stimulus can be used to enhance the realism of the explosion. This would include determining the magnitude, amount, and/or type of haptic stimulus to coincide with the directivity and orientation of the explosion.

These instances of generating haptic stimulus to coincide with the directivity and/or orientation of an effect in a three-dimensional view being conveyed by user interface device 12 are not intended to be limiting. Other instances of this exemplary use of position information to determine haptic stimulus may be implemented without departing from the scope of this disclosure. It will be appreciated that the description of varying haptic stimulus to reflect the directivity and/or orientation of events in the content being conveyed by user interface device 12 are not limited to three-dimensional views, or even to visual effects. The same principles may be applied to effects in two-dimensional views, and/or to audio effects.

In one embodiment, actuators 16 include one or more actuators that are fixed positionally with respect to user interface device 12 during conveyance of the content. For example, actuators 16 may include actuators carried by or included in furniture, a floor, a mat, and/or other objects that are fixed during conveyance of the content. In this embodiment, stimulus module 30 may determine haptic stimulus for the fixed positions of actuators 16. Position information related to these fixed positions may include one or more of position information that is preconfigured and/or prestored for use by stimulus module 30.

In one embodiment, actuators 16 include one or more actuators that are included in or carried by objects that are worn, carried, or otherwise moved by the user. In this embodiment, the haptic stimulus to be generated by the portable actuators is determined by stimulus module 30 based on position information received by stimulus module 30 from position module 28 that is related to the position of the users and/or the movable actuators with respect to user interface device 12. For example, the movable actuators may be included in game controllers, wearable braces, a pillow, a stuffed animal, a toy, and/or other objects.

In one embodiment, the stimulus module 30 is configured to determine the haptic stimulus based on the relative positions of body parts of a user. For example, if the user is holding one of controllers 20, position module 28 may determine the position of the controller 20 with respect to the trunk of the user. As the controller 20 gets closer to, or farther away from the user, the haptic stimulus determined by stimulus module 30 may vary based on the change in relative position. This change may be made simply by including the relative position between the trunk of the user and controller 20 in a determination of the position of the user with respect to user interface device 12 (e.g., instead of assuming 20 to reflect the position of the user without adjustment), or the change may be made specifically based on motion of the controller 20 into and/or away from the trunk of the user.

In one embodiment, the stimulus takes into account both the position of the user (and/or the controller 20) with respect to the user interface device 12 and the position of the controller with respect to the user. For example, the stimulus determined for the user in response to the user moving the controller 20 from his body to an arms length away from his body may be different from leaving the controller 20 at his body but stepping forward an arm's length. Similarly, stepping forward half and arm's length while extending his arm's halfway may result in a different stimulation than either of moving only the arms or only stepping forward.

In one embodiment, the haptic stimulus is determined to vary based on a rotational orientation of the controller 20 with respect to the trunk of the user, or other information related to the relative positions of the controller 20 with respect to the trunk of the user.

The actuator control module 32 is configured to control actuators 16 to generate the haptic stimulus determined by stimulus module 30. This includes communicating the haptic stimulus to be generated from processor 24 to actuators 16. The haptic stimulus to be generated may be communicated over wired communication links, wireless communication links, and/or other communication links between processor 24 and actuators 16. In one embodiment, at least a portion of the functionality attributed to the actuator control module 32 is disposed in a processor carried by controller 20, and/or some other object that carries one or more of actuators 16.

Figure 2:
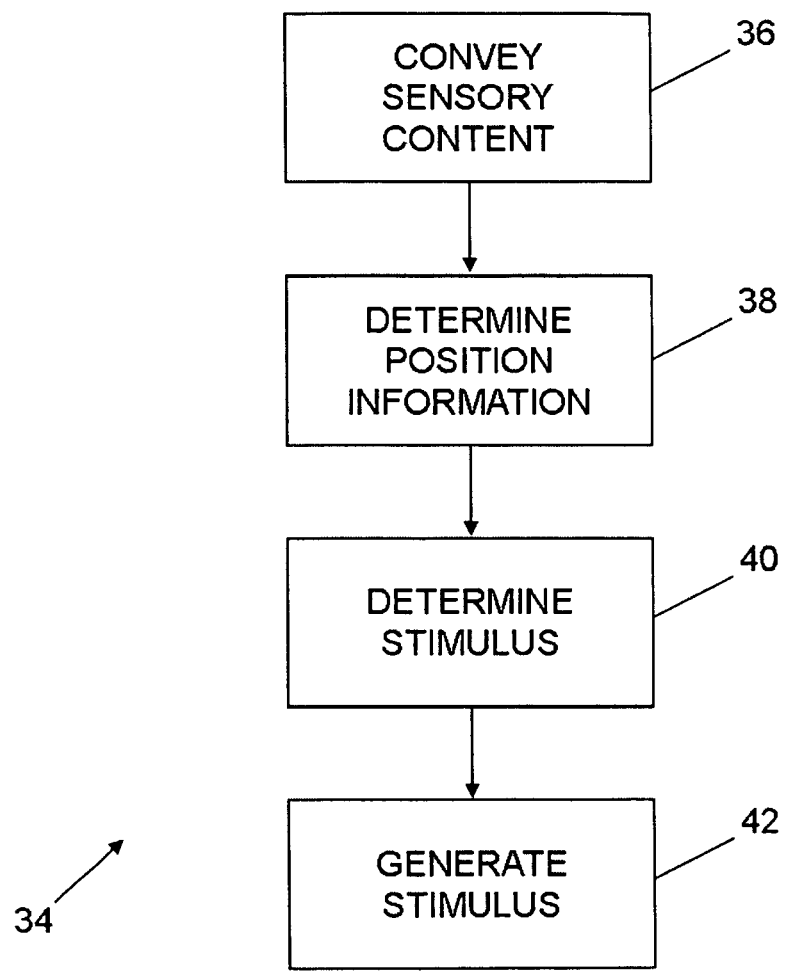
FIG. 2 illustrates a method of providing haptic stimulus associated with other sensory content, in accordance with one or more embodiments of the invention.

FIG. 2 illustrates a method 34 of providing haptic stimulus associated with other sensory content being conveyed to one or more users. The operations of method 34 presented below are intended to be illustrative. In some embodiments, method 34 may be accomplished with one or more additional operations not described, and/or without one or more of the operations discussed. Additionally, the order in which the operations of method 34 are illustrated in FIG. 2 and described below is not intended to be limiting.

In some embodiments, method 34 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 34 in response to instructions stored electronically on an electronic storage medium. The one or more processing devices may include one or more devices configured through hardware, firmware, and/or software to be specifically designed for execution of one or more of the operations of method 34.

At an operation 36, sensory content is conveyed to one or more users. The sensory content may include visual content, audio content, and/or other sensory content. The sensory content is conveyed to the one or more users by a user interface device similar to or the same as user interface device 12, having a content delivery portion similar to or the same as content delivery portion 14 (shown in FIG. 1 and described above).

At an operation 38, position information may be determined. The position information may be related to the position(s) of one or more of a user, one or more body parts of a user, a controller (e.g., a game controller), an actuator, and/or other objects. The position information may indicate position in an absolute coordinate system, relative to the user interface device, the content delivery portion, a user, and/or other objects. In one embodiment, operation 38 is performed by a position module similar to or the same as position module 28 (shown in FIG. 1 and described above).

At an operation 40, haptic stimulus to be generated for the one or more users is determined. The haptic stimulus is associated with the content conveyed to the user. The haptic stimulus is determined such that it varies as a function of position information. The position information may describe the position of one or more of a user, one or more body parts of a user, a controller (e.g., a game controller), an actuator, and/or other objects. The position information may indicate position in an absolute coordinate system, relative to the user interface device, the content delivery portion, a user, and/or other objects. The position information may include the position information determined at operation 38, position information that is preconfigured and/or prestored, and/or other position information. In one embodiment, operation 40 is performed by a stimulus module similar to or the same as stimulus module 30 (shown in FIG. 1 and described above).

At an operation 42, the haptic stimulus is generated for the user. In one embodiment, operation 42 is performed by one or more actuators similar to or the same as actuators 16 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of producing a haptic effect comprising:
receiving a sensory content signal from a user interface device;
receiving a sensor signal indicative of a body position of a first body part of a user with respect to a second body part of the user;
generating the haptic effect using the sensory content signal and the sensor signal;
determining, based on the sensor signal, the first body part moving towards the second body part or away from the second body part;
varying the haptic effect based on whether the first body part is moving towards the second body part or is moving away from the second body part; and
applying a drive signal to a haptic actuator to produce the haptic effect.

2. The method of claim 1, wherein the first body part comprises an arm.

3. The method of claim 2, wherein the second body part comprises a trunk.

4. The method of claim 1, wherein the sensory content signal comprises a visual content signal or an audio content signal.

5. The method of claim 1, further comprising receiving a second sensor signal indicative of a position of the user with respect to the user interface device, and wherein generating the haptic effect comprises using the sensory content signal, the sensor signal, and the second sensor signal.

6. The method of claim 5, wherein varying the haptic effect comprises varying the haptic effect based on the sensor signal reflecting a change in the body position of the first body part with respect to the second body part and the second sensor signal reflecting a change in the position of the user based on the position of the second body part with respect to the user interface device.

7. The method of claim 5, wherein varying the haptic effect comprises varying the haptic effect based on the second sensor signal reflecting a change in the position of the user with respect to the user interface device.

8. The method of claim 1, wherein varying the haptic effect comprises varying the haptic effect based on the sensor signal reflecting the first body part rotating around the second body part.

9. A haptic effect enabled system comprising:
a haptic actuator;
a drive module electronically coupled to the actuator, the drive module configured to
receive a sensory content signal from a user interface device,
receive a sensor signal indicative of a body position of a first body part of a user with respect to a second body part of the user,
receive a second sensor signal indicative of a position of the user with respect to the user interface device, determine, based on the sensor signal, whether the first body part is moving towards the second body part or is moving away from the second body part, and generate a haptic effect using the sensory content signal and the sensor signal and the second sensor signal, the drive module further configured to vary the haptic effect based on whether the first body part is moving towards the second body part or is moving away from the second body part, and based on the position of the user with respect to the user interface device; and a drive circuit electronically coupled to the drive module and the actuator, the drive circuit configured to apply a drive signal to the haptic actuator to produce the haptic effect.

10. The system of claim 9, wherein the first body part comprises an arm.

11. The system of claim 10, wherein the second body part comprises a trunk.

12. The system of claim 9, wherein the sensory content signal comprises a visual content signal or an audio content signal.

13. The system of claim 9, wherein the drive module is configured to vary the haptic effect based on the first body part rotating around the second body part.

14. A non-transitory computer readable medium having instructions stored thereon that, when executed by a processor, causes the processor to produce a haptic effect, the instructions comprising:

receiving a sensory content signal from a user interface device;

receiving a sensor signal indicative of a body position of a first body part of a user with respect to a second body part of the user;

determining, based on the sensor signal, whether the first body part is rotating around the second body part, generating the haptic effect using the sensory content signal and the sensor signal;

varying the haptic effect based on whether the first body part is rotating around the second body part; and applying a drive signal to a haptic actuator to produce the haptic effect.

15. The non-transitory computer readable medium of claim 14, wherein the first body part comprises an arm.

16. The non-transitory computer readable medium of claim 15, wherein the second body part comprises a trunk.

17. The non-transitory computer readable medium of claim 14, wherein the sensory content signal comprises a visual content signal or an audio content signal.

18. The non-transitory computer readable medium of claim 14, further comprising receiving a second sensor signal indicative of a position of the user with respect to the user interface device, and wherein generating the haptic effect comprises using the sensory content signal, the sensor signal, and the second sensor signal.

19. The non-transitory computer readable medium of claim 18, wherein varying the haptic effect comprises varying the haptic effect based on the position of the second body part with respect to the user interface device.

20. The non-transitory computer readable medium of claim 18, wherein varying the haptic effect comprises varying the haptic effect based on the second signal reflecting the first body part moving towards or away from the second body part and based on the second sensor signal reflecting a change in the position of the user with respect to the user interface device.

21. The non-transitory computer readable medium of claim 14, wherein varying the haptic effect comprises generating an in-motion haptic effect to reflect the first body part moving towards or away from the second body part based on the sensor signal.

* * * * *

UNITED STATES PATENT AND TRADEMARK OFFICE
CERTIFICATE OF CORRECTION

PATENT NO. : 9,987,555 B2  
APPLICATION NO. : 13/998001  
DATED : June 5, 2018  
INVENTOR(S) : Danny A. Grant et al.

Page 1 of 1

It is certified that error appears in the above-identified patent and that said Letters Patent is hereby corrected as shown below:

On the Title Page

Item (56) entitled "References Cited," under "OTHER PUBLICATIONS," the following references should be listed:
Notification of Reasons for Refusal dated March 7, 2018 in JP Appl. No. 2016-033055 (IMM360.JPD1) (NPL1)
Decision to Grant issued February 26, 2018 in corresponding European Patent Application No. 11 718 538.9

Signed and Sealed this
Twenty-first Day of August, 2018

Andrei Iancu
*Director of the United States Patent and Trademark Office*